United States Patent Office 3,493,530
Patented Feb. 3, 1970

3,493,530
PROCESS FOR THE POLYMERIZATION AND COPOLYMERIZATION OF HALOGENATED OLEFINS
Dario Sianesi and Gian Carlo Bernardi, Milan, Italy, assignors to Montecatini Edison S.p.A., Milan, Italy, a corporation of Italy
No Drawing. Filed July 5, 1966, Ser. No. 562,915
Claims priority, application Italy, July 30, 1965, 17,398/65
Int. Cl. C08f *1/60, 51/32*
U.S. Cl. 260—33.2                                    12 Claims

ABSTRACT OF THE DISCLOSURE

There is disclosed a new process for the polymerization and copolymerization of halogenated, especially perfluorinated, olefins in the presence of a macromolecular perfluorinated polyperoxide which is the reaction product obtained by photochemical reaction of oxygen with a perfluoroolefin in the liquid phase, and has the appearance and consistency of an oil or a viscous syrup. The products obtained consist essentially of the olefin homopolymers or copolymers and the macromolecular perfluorinated oils, in very wide ratios, depending on the initial amounts of monomers and polyperoxides used.

Prior art

It is known that by polymerizing or copolymerizing halogenated olefins in general, and specially fluorinated and chlorofluorinated olefins, solid products of plastomeric or elastomeric type, which find a wide use in their relevant application fields, are obtained. Well known, are, e.g., polytetrafluoroethylene and polyvinylfluoride, which are crystalline products having a high melting point and very good characteristics of thermal stability. It is also known that the copolymers of vinylidene fluoride with tetrafluoroethylene are thermo-plastic, while those of vinylidene fluoride with more than 15–20% of 1,2,3,3,3-pentafluoropropylene are of the elastomeric type and vulcanizable.

The present invention

It has now been found that by carrying out the polymerization or copolymerization of halogenated olefins, more particularly of perfluorinated olefins, in the presence of macromolecular perfluorinated polyperoxides, consisting essentially of C, F and O atoms, very stable polymeric mixtures are obtained. Furthermore, one of the components, the olefin homopolymer or copolymer formed during the reaction, has a higher thermal stability than the corresponding homopolymer or copolymers obtained by the methods heretofore used.

The invention therefore relates to a process for the polymerization and copolymerization of halogenated olefins, characterized in that one or more halogenated olefins are subjected to temperatures between −100° C. and +350° C. under a pressure from 0.01 to about 200 atm. in the presence of macromolecular perfluorinated polyperoxides having the general formula:

$$(C_3F_6O_x)_n$$

In which $n$ is a whole number from 5 to 100 and $x$ is higher than 1 and lower than 2. There are also present terminal acid fluoride groups of the —COF type, or transformation products thereof, obtained by hydrolysis, salt-formation, amidation and decarboxylation.

The macromolecular perfluorinated polyperoxides used according to the present invention were described in Italian patent application No. 4,567/65 filed on Mar. 3, 1965, now Italian Patent 802,089. They are the reaction products obtained by photo-chemical reaction of oxygen with a perfluoroolefin in the liquid phase. Their preparation in the presence of ultraviolet radiations was described in the said patent application No. 4,567/65, and also in Italian patent application No. 45,919/64, now Italian Patent 735,213. Said Italian applications were combined for filing in the United States, as application Ser. No. 446,292, now U.S. Patent 3,442,942. These polyperoxides have the appearance and consistency of an oil or a viscous syrup.

As the reaction products of the process according to the present invention we obtain polymeric mixtures consisting essentially of the olefin homopolymers or copolymers formed during the reaction, and of the said macromolecular perfluorinated oils, in very wide ratios, depending on the initial amount of monomers and polyperoxide used. When the perfluorinated polyperoxides are used in very limited proportions, with respect to the monomer to be polymerized, in proportions between 0.001 and about 5 parts by weight per 100 parts by weight of monomer or monomers to be polymerized, the reaction product substantially consists of the polymer or copolymer and of a negligible amount of macromolecular perfluorinated oil. In fact, the macromolecular perfluorinated polyperoxide exerts essentially the function of polymerization initiator and the polymer and copolymer thus obtained do not substantially differ from the polymer obtainable, under the same conditions, with the aid of initiators of conventional type, with the important advantage, however, that the fragments of initiator embedded in the polymer are both macromolecular and perfluorinated and represent a further-contribution to the chemical and thermal stability to the macromolecule chain formed. By operating under these conditions, polyperoxides having a high content of active oxygen, e.g., higher than 0.3 atom of active oxygen per each unit of combined perfluoropropylene units, are preferably used in order to obtain good polymerization rates. Moreover, the fact that the polyperoxides defined above are soluble in perhalogenated liquid media, makes it possible to obtain the polymerization of halogenated olefins in a homogeneous liquid phase, in contrast to what occurs by using initiators of the usual type, which are normally insoluble in liquid media having a high content of combined fluorine.

According to another embodiment of the present invention, when the perfluorinated polyperoxides are used in the polymerizations in relatively high proportions, e.g., in proportions that can reach 100 parts by weight per 1 part by weight of monomer or monomers to be polymerized, very stable mixtures with a high amount of perfluorinated oil and a minor amount of halogenated olefin polymer are obtained. In this case, polyperoxides having a low content of active oxygen, e.g., not higher than 0.2 atom of active O per each combined perfluoropropylene unit are preferably used, and the physical characteristics of the polymeric or copolymeric products are entirely new and different from those of the equivalent polymers obtained with the conventional initiators or with limited proportions of the same polymeric perfluorinated initiators. The polymeric products resulting from the use of amounts of said polyperoxides higher than about 5% have properties variable, depending, not only on the particular nature of the monomer or monomers subjected to polymerization, but also on the amount of original oil which is embedded in the reaction product at the end.

In general it has been observed that when the amount of polyperoxides is relatively low, e.g., lower than 10% by weight of the total product, the product has characteristics close to those of the polymer and copolymers obtained from the same monomers with conventional processes, although they show improved properties of thermal stability, chemical inertness, resistance to solvents, workability, etc., due to the embedded perfluorinated oil. In this case, the polyperoxides not only exert initially the function of polymerization initiator, but also behaves similar to a true plasticizer for the macromolecules of the polymer, with the important advantage of being, at least in part, chemically bound to the macromolecules of the polymer.

On the other hand, if the perfluorinated oil is present in a prevailing proportion, e.g., higher than 50% and lower than 99% by weight of the final polymeric product, the product assumes appearances and properties completely different from those of the polymers known heretofore, and tending, at the limit, to reach the characteristics of the starting fluorooxygenated polymer, modified by the presence of the new polymer therein, incorporated in various proportions. Since the fluoro-oxygenated polymers used as initiators according to the present process, have the physical appearance and the properties of oily substances, and are more or less viscous depending on the value of their molecular weight, by incorporating therein increasing amounts of a high molecular weight polymer, a gradual increase in their viscosity and consistence is observed, and the product gradually assumes the physical appearance and the characteristics of a lubricating grease. In general, this product has a white color and an exceptional stability to heat, solvents, and chemical reactants. In this type of reaction, in which the perfluorinated oil is a prevailing portion of the reacting substances, it exerts various functions; it acts both as an initiator and as the reaction medium.

At the end of the polymerization, the peroxidic group content of the starting perfluorinated oil obviously is remarkably decreased. The higher the polymerization temperature and time, the higher this decrease. However, the presence of a residual peroxidic character in the polymerization mixture can be highly useful, since it makes it possible to incorporate, by polymerization further amounts of the same olefin polymer or copolymer, or also of a different olefin polymer. If it is deemed preferable to have a complete absence of peroxidic activity in the final reaction product, this can be obtained by a simple heat treatment of the same reaction product for several hours at 100–200° C.

The reaction products having the appearance of homogeneous greases having a white color can find use as intermediates for the production of lubricating greases provided with exceptional properties of thermal and chemical resistance, as vehicles for perfluorinated polymers, as plasticizers and fillers for fluorinated polymers and copolymers of the plastomeric or elastomeric type, and as intermediates for the production of impregnating agents for hydro- and oil-repellent fibres, films, fabrics, papers, etc.

By considering as an example, the polymerization of tetrafluoroethylene with the compounds having the general formula $(C_3F_6O_x)_n$ obtained by photo-chemical oxidation of perfluoropropylene, it has been ascertained that this reaction can be carried out at temperatures between —80° and 350° C., under monomer pressures between a few mm. of Hg and 30 to 50 atmospheres, either by operating in the absence of any diluent or dispersing agent, or by operating in a solution, suspension, or emulsion, e.g., an aqueous one.

As the solvents for the reaction, various liquid media, preferably those containing a large proportion of combined fluorine or chlorine, can be used. Suitable solvents, e.g., are perfluorocyclobutane, perfluorodimethylcyclobutane, perfluoropropylpyrane, perfluorotributylamine, and various chlorosubstituted hydrocarbons, such as e.g., $CF_2Cl—CFCl_2$, $CF_2Cl_2$, $CHClF_2$, $CF_2Cl—CF_2Cl$, $CF_3—CCl_3$, etc.

When the initiator for the polymerization is a fluorooxygenated polymer with a relatively high content of active oxygen, e.g., having a value of $x$ higher than 1.1, is used, high reaction rates can be obtained at temperatures equal to, or even lower than, room temperature and under monomer pressures which can be lower than atmospheric pressure.

The polymerization can be carried out until the amount of starting initiator constitutes a negligible fraction, e.g., lower than 0.001% by weight, with respect of the total polymeric product. This product practically consists of a polytetrafluoroethylene which differs from the polymers heretofore known, particularly due to its better resistance to thermal degradation.

On the other hand, by adopting reaction conditions which are at the opposite limit of the field of applicability of the present process, tetrafluoroethylene can be polymerized at temperatures higher than 100° and lower than 350° C., under a pressure between atmospheric pressure and 100 atm., by contact with a substantial amount of polymeric fluorooxygenated initiator, preferably having a limited content of peroxidic oxygen, e.g., having a value of $x$ in the aforementioned formula, between 1.01 and 1.2.

Instead of using high reaction temperatures, it is also possible to carry out the polymerization at lower temperatures, e.g., at about room temperature, but operating in the presence of ultraviolet light which exerts a clear accelerating action on the polymerization. The reaction can be stopped when a limited amount, e.g., lower than 30% by weight, of tetrafluoroethylene has been incorporated in the form of polymer into the starting initiator. The polymeric product thus obtained has the appearance and the consistence of a grease, showing exceptional thermal stability, resistance to chemicals and solvents, with very good lubricating properties.

Besides the polymerization of tetrafluoroethylene, the process according to this invention can be applied to the polymerization and copolymerization of various unsaturated compounds, among which we can mention, by way of example: vinyl chloride, vinylidene chloride, vinyl fluoride, vinylidene fluoride, trifluoroethylene, hexafluoropropylene, 1,1,3,3,3-pentafluoropropylene, 1,2,3,3,3-pentafluoropropylene, 2,2,2,2-tetrafluoropropylene, 3,3,3-trifluoropropylene, trifluorochloroethylene, asymmetric difluoro-dichloroethylene, trifluorobromoethylene, hexafluorobutadiene, partially fluoro-substituted butadienes, fluoroisoprenes, styrene fluorinated, either in the nucleus or in the vinyl group, fluorinated vinyl ethers, acrylic and methacrylic esters, acrylonitrile and vinyl esters.

Particularly good results are obtained by using partially or completely fluorinated olefins. In this case, the fragments of perfluorinated polyperoxide which enter into the chain of fluorinated or perfluorinated polymer which is formed, considerably improve the stability characteristics of the polymer. This particular advantageous effect exerted on the fluorinated polymers can be easily explained by the homogeneousness of the perfluorinated structure of the polymer formed.

As said above, the aforementioned monomers can be subjected to polymerization simply by contacting, under the suitable conditions of pressure and temperature, the monomers with the fluorooxygenated polymer in the pure state, or in solution in a suitable solvent.

The perfluorinated polyperoxide can be used either as it is obtained from the synthesis reaction described in the aforementioned patent application, or after suitable treatments, e.g., of distillation, fractionation by precipitation from solutions, etc., which make it possible to separate the fraction thereof having the most desired characteristics, e.g., an average value $n$ within the specified limits (5 to 100).

It is also possible, before their use in the reaction, to transform the acid functional groups at the end of the chains of these perfluorinated polyperoxides by chemical reactions of conventional type, such as, e.g., hydrolysis of the group —COF to groups —COOH, esterification with aliphatic alcohols containing, e.g., from 1 to 4 carbon atoms, amidation with aliphatic or aromatic amines, etc. The peroxides can also be used in the polymerization after a decarboxylation treatment such as, e.g., that consisting of heating to temperatures between 100 and 350° C., the alkaline salts of the peroxides, either in the pure state or suspended or dispersed in suitable liquid media, such as e.g., ethylene glycol, dimethylether, acetonitrile, etc.

It is often possible, and it is often particularly advantageous, to carry out the polymerization and copolymerization according to the invention in the presence of an aqueous phase. To this end, the monomer or monomers to be polymerized can be contacted, preferably under some agitation, with a suspension or emulson of polyperoxide obtained by directly dispersing the desired polyperoxide amount in water, either neutral or made weakly alkaline by addition of bases such as e.g., KOH NaOH, $NH_4OH$. Due to the presence of terminal groups having an acid character, the polyperoxides form salts by contact with alkaline solutions, which if the molecular weight of the polyperoxide is sufficiently limited, are at least partially soluble in water. However, in any case, they form finely dispersed and stable aqueous emulsions or dispersions. This behaviour is very useful since, due to their particular chemical constitution when they are in the form of alkali or ammonium salts, these polyperoxides tend to favor the emulsion or intimate dispersion of the monomer or monomers to be polymerized in the same aqueous phase, thus allowing high polymerization rates and very effective removal of the reaction heat. Thus, in the presence of an aqueous phase, preferably weakly alkaline, the polyperoxides in question can exert the double function of polymerization initiator and, at the same time, of surface active emulsifier, thus making it possible by their use to carry out the polymerization according to the well known emulsion or aqueous dispersion reaction technique.

According to this procedure, it is within the scope of the present process, to use transfer agents for the regulation of the molecular weight of the polymer produced, to use buffering agents for carrying out the reaction under the desired pH conditions, and to use various reaction activators and accelerators which, as known to people skilled in the art, often are used in polymerizations carried out in the aqueous phase in the presence of initiators of a peroxidic nature.

Finally, another important characteristic of these polyperoxides, with respect to other initiators of a peroxidic nature, is their effectiveness both at very low temperatures and at temperatures near 300° C., as is demonstrated in the examples. See in particular Examples 5 and 8.

Some examples of the present process, having an illustrative, but not limitative, character follow.

Example 1

As the polyperoxide, a product is used which is derived from a photo-chemical reaction, carried out up to a transformation of about 10%, of liquid perfluoropropylene, at −30° C., with molecular oxygen, under atmospheric pressure, in the presence of ultraviolet light, coming from a high pressure Hg-vapour generator of the Nanau Q81 type.

By evaporation of unreacted perfluoropropylene and after further treatment under vacuum of 0.5 mm. Hg at room temperature, prolonged for 12 hours in order to eliminate any trace of volatile products, the peroxide polymer was obtained in the form of a highly viscous colorless liquid. The composition of the product corresponds to an average formula $(C_3F_6O_{1.17})_n$. The acidimetric equivalent weight was evaluated at around $1.2 \times 10^3$ by titration at 20° C. with a normal NaOH solution of the terminal groups —COF and —COOH, and determination with thorium nitrate of the hydrolyzable fluorine ions. By titration of iodine freed from an initiator sample after prolonged contact with NaI at room temperature in a 1:4 solution of $CF_2Cl-CFCl_2$ and acetic anhydride, an active oxygen content corresponding to about 0.1 oxygen atoms per each combined $C_3F_6$ unit was found.

In a stainless steel autoclave having an inner volume of 100 cc., 56.0 g. of this polyperoxide are introduced.

The autoclave is then closed and vacuum is applied thereto up to 0.5 mm. Hg, nitrogen is introduced into the autoclave and vacuum is applied again so as to completely remove air.

The autoclave is then immersed in a cooling bath at −80° C. and 20.0 g. of tetrafluoroethylene monomer are introduced into the autoclave by vacuum distillation.

The closed autoclave is introduced into an oscillating furnace and then heated to the constant temperature of 100° C. This temperature is maintained for 16 hours under agitation. The autoclave is then heated to 120° C. for 4 hours, while maintaining the agitation.

After this time, the autoclave is cooled to room temperature, the residual gases are let out, and the product contained in the autoclave is collected.

64 g. of a seemingly homogeneous, white solid having the consistence of a grease are obtained, which has a high resistance to the action of heat, and of chemical reactants.

A sample of this material is kept for 5 hours at the temperature of 200° C. without noticing any evidence of de-mixing between the oil and the polyolefin forming the intimate mixture.

Similar comparison tests were carried out relating to the stability with respect to the separation of the liquid and solid phases in mixtures obtained by mechanical dispersion of various types of polytetrafluoroethylene as fine powder, separately obtained by conventional methods, in fluorooxygenated oils having a composition similar to that of this example. In each case a rapid de-mixing effect was observed after only short periods of heating of the mixtures at temperatures between 50° and 100° C.

Samples of the product obtained in the above described reaction are subjected to extraction treatments with various solvents such as, benzene, n-heptane, carbon tetrachloride, methylene chloride, and ethyl acetate at their boiling temperature. In no case is even partial solubilization of the product observed.

A sample of 20 g. of this product is subjected to continuous extraction with boiling 1,1,2-trifluorotrichoroethane. Initially, the formation of a translucid, seemingly homogeneous gel, is observed, which, as the treatment goes on, dissolves, leaving as the residue, after extraction for 72 hours, 3.1 g. of a high moleculer weight polymer having a crystalline melting point of about 320–325° C., and exceptional characteristics of thermal and chemical resistance. The IR absorption spectrum of this polymer corresponds to that of a polytetrafluoroethylene in which non-perfluorinated terminal groups are absent.

Example 2

25.5 g. of the perfluorooxygenated product described in Example 1, are slowly poured into about 100 cc. of a 3% aqueous ammonia solution while vigorously agitating. Aqueous ammonia is added again till neutrality, while continually agitating. 150 g. of a neutral aqueous emulsion of the polymeric initiator are thus obtained.

This emulsion is introduced into an autoclave having an inner volume of 200 cc. The autoclave is closed, and cooled to −80° C. by placing it in a cooling bath. All the air is then eliminated therefrom with the aid of vacuum, and 10.0 g. of $C_2F_4$ are then introduced by vacuum distillation.

The autoclave is placed in an oil bath at 78° C. and is kept under agitation for 16 hours. At the end of this time, the polymerization of $C_2F_4$ is quantitative.

The product obtained is filtered from the water, repeatedly washed with boiling water, and dried at 100° C., under vacuum of 15 mm. Hg till constant weight is observed.

The dry product is white, has a pasty consistency, and has exceptional stability with respect to organic solvents.

Example 3

13.8 g. of the fluorooxygenated oil described in Example 1 are introduced into a glass vessel having the capacity of 25 cc. provided with a magnetic stirrer and immersed in a thermostatic bath.

The vessel is completely evacuated and connected with a mercury burette containing gaseous $C_2F_4$ under 1 absolute atm.

The vessel is kept for 3 hours at 20° C. while moving the magnetic agitator and restoring with $C_2F_4$, constantly under a pressure of 1 atm., as the monomer is consumed. The reaction is stopped when a total of 0.220 g. of $C_2F_4$ have been introduced.

The product thus obtained has the appearance of a grease and has very good lubricating properties.

Example 4

19.1 g. of the fluorooxygenated oil described in Example 1 are introduced into a tubular vessel closed at one end and having a volume of 50 cc., provided with a dipping tube for the gas inlet and with an outlet tube.

The vessel is immersed in an oil bath kept at 200° C. and a slow $C_2F_4$ current under atmospheric pressure is passed through the oil. As the reaction proceeds, the fluorooxygenated oil becomes dull white and its viscosity increases. After 2 hours and 15 minutes the reaction is stopped.

The product obtained is a fluid, odorless, white, homogeneous grease having very good lubricating properties.

Example 5

265 g. of the fluorooxygenated oil described in Example 1 are introduced into a 250 cc. flask provided with a dipping inlet and gas outlet pipe.

The flask is heated to 300° C. and a current of about 10 liters per hour of $C_2F_4$ under atmospheric pressure is passed through the flask. After 2 hours and 30 minutes, the $C_2F_4$ flow is stopped and the flask is brought again to room temperature.

167 g. of a thick, white grease, having very good lubricating properties, are obtained, which at the IR and centesimal analysis appear to contain about 7% of polymerized tetrafluoroethylene.

Example 6

85 g. of the fluorooxygenated oil described in Example 1 are introduced into a glass flask of the capacity of 250 cc., provided with a glass agitator and inlet pipe. All the air is removed from the apparatus by applying vacuum and introducing nitrogen, alternatively.

The apparatus is then connected under vacuum with a vial containing $C_2F_4$ in the liquid state, kept at the temperature of −78° C. by means of a cooling bath. The glass flask is kept at 25° C. with the agitator in motion. The reaction is carried on for 2 hours and 30 minutes.

During this time 10.5 g. of $C_2F_4$ are polymerized. A pasty, white, homogeneous product having good lubricating properties is obtained.

Example 7

The fluorooxygenated oil used as the catalyst in the present example is prepared by bubbling, in a suitable apparatus, molecular oxygen under atmospheric pressure into $C_3F_6$, kept at the temperature of −30° C. by means of a cooling bath, and contemporaneously irradiating with U.V. radiations generated by a mercury-vapour lamp of the type known as "low pressure" of the Hanau NK 6/20 type.

The fluorooxygenated oil thus obtained has a composition corresponding to the formula $(C_3F_6O_{1.35})_n$ with an acidimetric equivalent weight of the order of $3 \times 10^3$, and with an active oxygen content corresponding to 0.3 oxygen atom per $C_3F_6$ unit.

17.88 g. of this product are introduced into the apparatus described in Example 3, and therein they are contacted with gaseous $C_2F_4$ under a pressure of 0.1 atm. The reaction is carried out at 20° C., while keeping the monomer pressure constant. During 5 hours and 20 minutes, 0.700 g. of $C_2F_4$ are absorbed.

As the product a white, viscous grease having very good lubricating properties is obtained.

Example 8

11.25 g. of the fluorooxygenated oil described in Example 7 are introduced into a glass vial having a volume of 25 cc. After elimination of all the air contained in the vial by applying vacuum and introducing nitrogen repeatedly, the vial is cooled to −180° C. and 10 g. of $C_2F_4$ are introduced by vacuum distillation.

The vial is closed, brought to the temperature of −78° C. and kept at this temperature for 20 hours. At the end, the vial is opened and the excess of unreacted $C_2F_4$ is evaporated.

12.8 g. of a white, viscous, solid product, having good lubricating properties remain in the vial.

The infrared spectrum of the product obtained shows both the characteristic absorptions of the starting fluorooxygenated oil and of polytetrafluoroethylene.

Example 9

19.0 g. of the fluoroxygenated oil described in Example 1, are introduced into a small flask having a volume of 25 cc. The air contained in the flask is completely eliminated by applying vacuum and introducing nitrogen repeatedly; the flask is then connected, after further application of a vacuum of 0.5 mm. Hg, with a mercury burette containing vinylidene fluoride under atmospheric pressure. The temperature of the flask is kept at 88° C. by means of a thermostatic bath. Within 4 hours and 45 minutes, 0.1 g. of vinylidene fluoride are absorbed.

A homogeneous, white product having the appearance of a fluid grease is obtained.

Example 10

In the same apparatus and with the same modalities as Example 9, 18 g. of the same fluorooxygenated oil are reacted with $CF_2=CFCl$ under atmospheric pressure and at 20° C. Within 3 hours, 1.0 g. of $CF_2=CFCl$ are absorbed.

The product obtained is a very thick, dull, white grease having high lubricating properties.

Example 11

An aqueous emulsion, neutralized with ammonia, of perfluorooxygenated oil is first prepared as described in Example 2.

150 g. of this emulsion, containing 25.5 g. of perfluorooxygenated oil, are introduced into a stainless steel autoclave having an inner volume of 200 cc. The air contained in the autoclave is completely removed by the usual methods, after having cooled the autoclave to −78° C.

8.0 g. of vinylidene fluoride are introduced into the same autoclave by vacuum distillation. The autoclave is heated to +78° C. and is kept at this temperature, under alternative agitation, for 16 hours. During this time, the pressure in the autoclave decreases from 42 atm. to 9.8 atm. The polymeric product thus obtained is washed and dried at 100° C. under vacuum (residual pressure of 15 mm. Hg) till constant weight is observed.

The product appears as a while, pasty solid. In the infrared spectrum of the product, bands attributable to —$CF_2$—$CH_2$— units are present, together with the characteristic absorption of the starting oil.

A portion of the product obtained is dissolved in acetone and precipitated again by pouring the acetone solution into a water-methanol mixture (1:1).

A powdery precipitate is obtained, which after drying, is hot moulded into a transparent, flexible and tough film. The moulded product has a crystalline melting point of 165° C., and in its IR spectrum, the bands attributable to —$CF_2$—$CH_2$— units, and to the polymeric fluorooxygenated compound are still present.

Example 12

50 g. of the fluoro-oxygenated oil described in Example 1 are poured, while vigirously agitating, into 700 cc. of $H_2O$ containing, in solution, 4.0 g. of NaOH, so as to obtain an emulsion.

The emulsion thus prepared is placed in an autoclave having the inner volume of 1,000 cc., provided with a paddle-agitator. With the usual methods the air contained in the autoclave is completely removed, and vinylidene fluoride is introduced up to 20 atm. into the autoclave from a cylinder. The autoclave is heated to the temperature of 95° C. and vinylidene fluoride is introduced again up to the pressure of 30 atm. The autoclave is then kept for 10 hours under the latter temperature and pressure conditions by introducing additional vinylidene fluoride as the polymerization proceeds.

After aforesaid period of time, the autoclave is cooled, the residual gas is discharged, and the product obtained, which appears as a soft, white mass, is withdrawn from the autoclave.

The product mass is dispersed and homogenized, carefully washed with water, and dried at 100° C. under a residual pressure of 15 mm. Hg, till constant weight is observed. The weight of the dry product is 84.60 g. In the I.R. spectrum of the product, the characteristic bands of vinylidene fluoride polymer are present, together with the characteristic bands of the starting initiator.

Example 13

90 g. of the oil described in Example 1 are poured, while vigorously agitating, into 1,500 cc. of $H_2O$ containing 7.5 g. of NaOH in solution. A very stable emulsion is thus obtained.

This emulsion is introduced into a stainless-steel autoclave having an inner volume of 2,500 cc., provided with an anchor-agitator. Air is completely eliminated from the autoclave by operating according to the usual methods. The autoclave is heated to the temperature of 100° C., and finally, a gaseous mixture of vinylidene fluoride and of 1 H-pentafluoropropene (cis), in the molar ratio of 3:1 is introduced into the same autoclave by means of a compressor, up to a pressure of 35 atm. As the polymerization proceeds, further amounts of the said monomer mixture are introduced, always by means of a compressor as to keep the pressure constant at 35 atm. After 3 hours and 40 minutes the introduction of gases is stopped, the autoclave is cooled, and the residual gases are discharged.

The product obtained is carefully washed with water and dried. It weighs 600 g. and looks like a non-vulcanized rubber. Under the polarizing microscope the product appears to be completely amorphous.

A portion of this product is mixed, in a roll mixer, with "Hisil" $SiO_2$ (20 parts percent of the polymer), "Maglite D" MgO (15 parts percent of the polymer) and hexamethylenediamine carbamate (3 parts percent of polymer).

From this mixture by moulding in a press at 150° C. under a pressure of 50 kg./cm.³, for 30 minutes, laminae having a thickness of about 1 mm. are obtained. These laminae are vulcanized in an air-circulation oven at 200° C. for 20 hours, and from them specimens are prepared as described in ASTM 412 D.

These specimens, at 20° C. and on a dynamometer having advancing speed of 50 mm./min., show the following dynamometric properties:

Modulus at 100% _____ kg./cm.² __ 31
Modulus at 200% _____ kg./cm.² __ 59
Tensile strength _____ kg./cm.² __ 150
Elongation at break _____ percent __ 480

Thus the product has the properties of a good vulcanized rubber.

Example 14

40 g. of the fluorooxygenated oil described in Example 1 are introduced into an autoclave having an inner volume of 200 cc. Air is completely removed from the autoclave by following the usual methods. The autoclave is cooled to −78° C., and 50 g. of hexafluoropropene and 50 g. of tertafluoroethylene are introduced by vacuum distillation. The autoclave is heated to 70° C. and is kept at this temperature for 5 hours while subjecting it to agitation. The autoclave is then cooled, the residual gases discharged, and 115 g. of a white, solid product are withdrawn from the autoclave.

This copolymer appears to be amorphous and can be easily moulded at temperatures higher than 200° C. into transparent, tough and flexible films.

Example 15

1 g. of the fluorooxygenated oil described in Example 7 is introduced into a stainless steel autoclave having an inner volume of 100 cc. By the already described methods, air is completely eliminated from the autoclave and 20 g. of vinyl fluoride are introduced into the latter. The autoclave is heated to 80° C. for 6 hours under alternating agitation while the pressure reaches a maximum value of about 80 atm. and then gradually decreases.

At the end of the specified time the residual gases are discharged, and 6.9 g. of a polymeric product are obtained which shows, in general, the physical characteristics of polyvinyl fluoride and appears to be particularly stable to the action of high temperature. The intrinsic viscosity of the polymeric product, determined in dimethyl formamide at 110° C., is 0.4 (100 cc./g.). It has a crystalline melting point between 190° and 200° C. A sample of this product is moulded at 220–230° C. into a transparent, flexible lamina having high mechanical characteristics.

Example 16

A sample of the fluoro-oxygenated oil described in Example 1 is treated with 5% of its weight of molten KOH and heated to about 300° C. until a complete neutralization and complete decomposition of the terminal acid groups is obtained. The neutral oil resulting from this treatment is then subjected to fractional distillation.

240 g. of the fraction having a boiling temperature between 200 and 240° C., under a pressure of 0.1 mm. Hg, are placed in a quartz flask having a volume of 250 cc., provided with paddle agitator and gas inlet and outlet pipes. Under the quartz flask, a lamp is placed which emits U.V. radiations. The lamp is switched on, the liquid contained in the quartz lamp is agitated, and a slow $C_2F_4$ current is passed through the flask, after having completely removed the air contained in the reactor by the usual methods.

After 22 hours of reaction, 7.6 g. of $C_2F_4$ are polymerized. The product thus obtained is a homogeneous grease having a white color, very good lubricating properties, and is exceptionally stable to the action of heat and chemical reactants.

Example 17

As the polymerization initiator, a neutral perfluorooxygenated oil, prepared as described in Example 16, but having a distillation range of 100–200° C. under a pressure of 0.1 mm. Hg is used.

25.0 g. of the said polymeric initiator are introduced into a stainless steel autoclave having an inner volume of 100 cc. By the usual methods the air contained in the autoclave is completely removed, and 15.0 g. of $C_2F_4$ are introduced into the autoclave. The autoclave is heated to the temperature of 150° C. while agitating, and this temperature is maintained for 16 hours. The pressure reaches a maximum value of 45 atm., and then progressively decreases to a few atmospheres at the end of this time.

After having discharged the residual gases, a dull white product is withdrawn from the autoclave having the consistancy of a grease, having good lubricating properties, a high resistance to the action of high temperatures, and high resistence to solvents and aggressive chemical products.

Example 18

With the aid of a source of U.V. radiations obtained from pressure of Hg vapor lamps, of the Hanau NK 6/20 type, directed to liquid perfluoropropylene kept at a temperature of about −70° C. and in which an oxygen current is bubbled through, a polymeric peroxidic compound is obtained having the average composition $(C_3F_6O_{1.98})_n$, an acidimetric equivalent weight of the order of $5 \times 10^3$, and an active oxygen content higher than 0.5 oxygen atom per $C_3F_6$ unit.

0.1 g. of this compound are dissolved, in an autoclave having a capacity of 100 cc., in 20 cc. of perfluorodimethylcyclobutane. The autoclave, after removal of the air therein contained, is connected with a source of tetrafluoroethylene, at 20 atm., while keeping it in agitation at a temperature of 30° C. After reaction for 10 hours in the autoclave, and elimination of the solvent, 42 g. of a white polymer having the usual characteristics of polytetrafluoroethylene, but with improved properties of thermal stability are obtained.

From this polymer, by cold pre-shaping under a load of about 4400 p.s.i., a small disk is obtained which is then subjected to a sintering treatment at 380° C. prolonged for a period of ½ hour. Standard tensile specimens are then prepared which show the very good mechanical characteristics of tensile strength—380 kg./cm.$^2$, and elongation at break—360%.

A further period of 48 hours of heating to 380° C. does not appreciably modify these characteristics of the polymer.

Example 19

0.1 g. of the peroxidic initiator described in Example 18 and 10.0 g. of vinyl chloride monomer are introduced into a glass vial having the capacity of 20 cc. The vial is closed and kept in agitation at the temperature of 45° C. for a period of 24 hours.

At the end of this time, after having removed the residual monomer, 5.5 g. of polyvinyl chloride having an intrinsic viscosity, in cyclohexanone at 30° C., of 0.4 (100 cc./g.) are obtained.

As will be apparent, various changes in details may be made in the practice of this invention without departing from the spirit thereof. It is intended, therefore, to include in the scope of the appended claims, all such modifications in details as will be obvious ot those skilled in the art from the description and working examples given herein.

What is claimed is:
1. A process for the copolymerization of at least one halogenated olefin, characterized in that at least one of the halogenated olefins is heated to temperatures between −100° C. and +350° C. under pressures from 0.01 to about 200 atm., in presence of a macromolecular perfluorinated polyperoxide having the general formula

$$(C_3F_6O_x)_n$$

in which $n$ is a whole number from 5 to 100, and $x$ is higher than 1 and not higher than 2, said polyperoxide containing terminal groups selected from the class consisting of acid fluoride groups of the —COF type, and of transformation products obtained by hydrolysis, salt-formation, amidation, and decarboxylation of said —COF groups, and the polyperoxide and halogenated olefin to be polymerized being used in amounts between 0.001:100 and 99:1 parts by weight, wherein at least part of the polyperoxide reacts chemically with the halogenated olefin to form a copolymer.

2. A process according to claim 1, in which the polyperoxide is used as the polymerization initiator in amounts between 0.001 and 2 parts by weight per 100 parts of halogenated olefin.

3. A process according to claim 1, in which the polyperoxide is used as the polymerization initiator and plasticizer for the polymer obtained, in amounts higher than 2% and lower than 10% by weight of the halogenated olefin.

4. A process according to claim 1, in which the polyperoxide is used as polymerization initiator, reaction medium and emulsifying surface-active agent, in amounts between 0.5 and 99 parts by weight per 1 part by weight of halogenated olefin.

5. A process according to claim 1, in which the olefins are selected from the group consisting of tetrafluoroethylene, vinylchloride, vinylidene chloride, vinylfluoride, vinylidene fluoride, trifluoroethylene, hexafluoropropylene, 1,1,3,3,3-pentafluoropropylene, 1,2,3,3,3-pentafluoropropylene, 2,3,3,3-tetrafluoropropylene, 3,3,3-trifluoropropylene, trifluorochloroethylene, asymmetric difluoro-dichloroethylene, trifluoro-bromoethylene, hexafluorobutadiene, partially fluoro-substituted butadienes, fluoroisoprenes, styrenes fluorinated in the aromatic nucleus, and styrenes fluorinated in the vinyl group.

6. A process according to claim 5, in which at least one perfluorinated olefin is used.

7. A process according to claim 1, characterized in that the process is carried out in the absence of diluent or dispersing agent.

8. A process according to claim 1, characterized in that the process is carried out in an aqueous medium selected from the group consisting of solutions, suspensions, and emulsions.

9. A process according to claim 1, characterized in that the polymerization is carried out in the presence of liquid selected from the group consisting of fluorinated and chlorofluorinated solvents.

10. A process according to claim 9, in which the solvents are selected from the group consisting of perfluorocyclobutane, perfluoro-dimethyl-cyclobutane, perfluoropropylpyrane, perfluorotributylamine, $CF_2Cl\text{-}CFCl_2$, $CF_2Cl_2$, $CHClF_2$, $CF_2Cl\text{-}CF_2Cl$ and $CF_3\text{-}CCl_3$.

11. Polymeric compositions obtained according to the process of claim 1.

12. Polymeric compositions according to claim 11, in which the halogenated olefin is tetrafluoroethylene.

References Cited
UNITED STATES PATENTS

| | | |
|---|---|---|
| 2,510,078 | 6/1950 | Compton et al. |
| 2,748,098 | 5/1956 | Passino. |
| 2,833,686 | 5/1958 | Sandt. |
| 2,915,509 | 12/1959 | Honn et al. |
| 2,975,163 | 3/1961 | Lo. |

MORRIS LIEBMAN, Primary Examiner

H. H. FLETCHER, Assistant Examiner

U.S. Cl. X.R.

204—158; 260—29.6, 33.8, 92.1, 348, 484, 535, 544, 561, 610, 653.1